(12) United States Patent
Oz et al.

(10) Patent No.: US 8,081,657 B2
(45) Date of Patent: Dec. 20, 2011

(54) METHOD AND DEVICE FOR PROVIDING VIDEO, DATA AND VOICE TO END USER DEVICES

(75) Inventors: Ran Oz, Modi'in (IL); Nery Strasman, Ramat-Gan (IL)

(73) Assignee: Bigband Networks Inc., Redwood City, CA (US)

( * ) Notice: Subject to any disclaimer, the term of this patent is extended or adjusted under 35 U.S.C. 154(b) by 1300 days.

(21) Appl. No.: 11/277,110

(22) Filed: Mar. 21, 2006

(65) Prior Publication Data
US 2006/0268697 A1    Nov. 30, 2006

Related U.S. Application Data

(60) Provisional application No. 60/664,542, filed on Mar. 22, 2005, provisional application No. 60/764,852, filed on Feb. 3, 2006.

(51) Int. Cl.
*H04J 3/16*    (2006.01)
*H04J 3/22*    (2006.01)
*H04N 7/173*   (2011.01)

(52) U.S. Cl. ............ 370/468; 370/477; 725/86; 725/87; 725/95

(58) Field of Classification Search ............ 370/468.477, 370/390; 725/86, 87, 95
See application file for complete search history.

(56) References Cited

U.S. PATENT DOCUMENTS

| | | | | |
|---|---|---|---|---|
| 6,137,793 | A * | 10/2000 | Gorman et al. | 370/360 |
| 6,192,257 | B1 * | 2/2001 | Ray | 455/566 |
| 6,658,512 | B1 * | 12/2003 | Gokulrangan | 710/117 |
| 6,714,545 | B1 * | 3/2004 | Hugenberg et al. | 370/395.1 |
| 6,973,081 | B1 * | 12/2005 | Patel | 370/390 |
| 7,103,063 | B2 * | 9/2006 | Fang | 370/452 |
| 7,191,246 | B2 * | 3/2007 | Deshpande | 709/233 |

(Continued)

FOREIGN PATENT DOCUMENTS

WO    WO 03084152 A1 *    10/2003

OTHER PUBLICATIONS

Hugh M. Smith, Matt W. Mutka, Eric Torng, "Bandwidth Allocation for Layered Multicasted Video," icmcs,pp. 9232, 1999 IEEE International Conference on Multimedia Computing and Systems (ICMCS'99)—vol. 1, 1999.*

(Continued)

*Primary Examiner* — Ayaz Sheikh
*Assistant Examiner* — Tarell Hampton
(74) *Attorney, Agent, or Firm* — Reches Patents

(57) ABSTRACT

Method and system for providing data, video and voice to a group of end user devices includes receiving end user device group quality of service rules and access network node bandwidth constraints; assigning multicast addresses and unicast addresses to end user devices of the group in response to the access node bandwidth constraints; and providing, in response to the end user device group quality of service rules and requests to receive services from the residential gateways, data, video and voice utilizing the assigned multicast addresses and unicast addresses. Further methods include receiving location information representative of distances between multiple end user devices and access nodes; defining end user bandwidth constraints in response to the location information and in response to access node bandwidth constraints; and providing, in response to the end user bandwidth constraints and to requests to receive services from the end user devices, data, compressed video and voice.

23 Claims, 5 Drawing Sheets

U.S. PATENT DOCUMENTS

| | | | |
|---|---|---|---|
| 7,212,634 B2* | 5/2007 | Briscoe | 380/203 |
| 7,369,567 B2* | 5/2008 | Newberg et al. | 370/432 |
| 7,466,655 B1* | 12/2008 | Zhao | 370/238 |
| 2001/0025377 A1* | 9/2001 | Hinderks | 725/109 |
| 2003/0035481 A1* | 2/2003 | Hahm | 375/240.16 |
| 2004/0010616 A1* | 1/2004 | McCanne | 709/238 |
| 2005/0213656 A1* | 9/2005 | Liu et al. | 375/240.01 |
| 2005/0233728 A1* | 10/2005 | Karaoguz et al. | 455/406 |
| 2005/0246756 A1* | 11/2005 | Leddy et al. | 725/129 |
| 2006/0047845 A1* | 3/2006 | Whited et al. | 709/231 |
| 2006/0171390 A1* | 8/2006 | La Joie | 370/390 |
| 2007/0005804 A1* | 1/2007 | Rideout | 709/246 |

OTHER PUBLICATIONS

Jingxuan Liu; Ansari, N., "A new control architecture with enhanced ARP, burst-based transmission, and hop-based wavelength allocation for ethernet-supported IP-over-WDM MANs," Selected Areas in Communications, IEEE Journal on, vol. 22, No. 8, pp. 1419-1431, Oct. 2004.*

* cited by examiner

METHOD AND DEVICE FOR PROVIDING VIDEO, DATA AND VOICE TO END USER DEVICES

RELATED APPLICATIONS

This application is a NONPROVISIONAL of, claims priority to and incorporates by reference U.S. Provisional Patent Application 60/664,542 entitled "Home grooming—multicast and unicast addresses", filed Mar. 22, 2005, and U.S. Provisional Patent Application 60/764,852 entitled "Dynamic transmission for switched digital television and IPTV", filed Feb. 3, 2006; each of which are assigned to the assignee of the present invention.

FIELD OF THE INVENTION

The present invention relates to communication systems and methods and especially to methods and systems for providing video, data, and voice to end user devices.

BACKGROUND

Triple play networks (also referred to as broadband networks) aim to provide video, data and voice to residential users. These networks usually include various routers, switches aggregators and the like that are capable of transferring various types of information encapsulated in packets or frames, but are not able to dynamically manipulate or compress video streams.

A typical triple play network includes a super headend (SHE), multiple video headend offices and multiple video switching offices (also referred to as central offices) that include access nodes (such as Digital Subscriber Line Access Multiplexers—DSLAMs) that are connected to multiple residential devices.

The access node can receive a certain amount of incoming bandwidth. It sends, usually over pairs of twisted wires, information streams that convey data, video, and voice.

The number of resident devices as well as the bandwidth requested by each device has dramatically increased during the last few years. Applications such as high definition television require substantial bandwidth. A typical home may include multiple televisions, multiple computers and multiple high performance communication devices such as digital phones and the like. In many homes these devices are connected to the access network via a residential access gateway. The residential access gateway can also be viewed as an end-user device.

The bandwidth that can be supplied to a certain residential access getaway is responsive to the distance between that gateway and between the access node that can be located within the central office.

The bandwidth that is requested by a residential access gateway can dramatically change from hour to hour and from day to day. In order to maintain a profitable telecommunication services telecommunication suppliers usually design their network to support characteristic bandwidth consumption requirements, and not necessarily maximal and especially unreasonable scenarios. The network design usually includes parameters such as the locations of the DSLAMs, the input bandwidth of the DSLAMs and the output bandwidth that can be output from the DSLAM (either aggregate bandwidth or bandwidth per end-user).

There is a growing need to provide efficient methods and devices for providing video, data, and voice to end user devices.

SUMMARY OF THE INVENTION

According to an embodiment of the invention a method for providing data, video, and voice to a group of end user devices is provided. The method includes: receiving end user device group quality of service rules, access network node bandwidth constraints; assigning multicast addresses and unicast addresses to end user devices of the group in response to access node bandwidth constraints; and providing, in response to the end user device group quality of service rules and to requests to receive services from the residential gateways, data, video and voice utilizing the assigned multicast addresses and unicast addresses.

Conveniently, the method includes compressing at least one video stream provided to at least one end user device.

Conveniently, the method includes allocating a fixed bandwidth to time sensitive traffic, and allocating remaining bandwidth to data and video.

Conveniently, the method includes providing targeted advertisements to end user devices that are associated with unicast addresses.

Conveniently, the method includes compressing video streams in response to an amount of end-users that request to view the video streams.

Conveniently, the method includes compressing video streams in response to video quality of service levels associated with multiple end-users that receive the video stream.

Conveniently, the method includes assigning multicast and unicast addresses in response to end-user statistics.

Conveniently, the method includes further compressing one video stream provided to an end user device by a higher compression ratio than another video stream provided to that end user device.

Conveniently, the method includes enforcing quality of service rules by selectively compressing video streams.

Conveniently, the method includes assigning multicast addresses and unicast addresses to end user devices in response to their location.

According to an embodiment of the invention a method for providing data, video and voice to a group of end user devices is provided. The method includes: receiving location information representative of distances between multiple end user devices and access nodes; defining end user bandwidth constraints in response to the location information and in response to access node bandwidth constraints; and providing, in response to the end user bandwidth constraints and to requests to receive services from the end user devices, data, compressed video and voice.

According to an embodiment of the invention a system for providing data, video, and voice to a group of end user devices is provided. The system includes a management entity, a video aware unit and a data aware unit. The video aware unit is connected to the data aware unit. The management unit is accessible to at least one out of the data aware unit and the video aware unit. The system is adapted to receive end user device group quality of service rules, and access network node bandwidth constraints. The management entity is adapted to assign multicast addresses and unicast addresses to end user devices of the group in response to access node bandwidth constraints. At least one out of the data aware unit and the video aware unit is adapted to provide, in response to the end user device group quality of service rules and to requests to receive services from the residential gateways, data, video and voice utilizing the assigned multicast addresses and unicast addresses.

It is noted that the video aware unit and the data aware unit can coordinate in order to provide, in response to the end user device group quality of service rules and to requests to receive services from the residential gateways, data, video, and voice utilizing the assigned multicast addresses and unicast addresses.

According to an embodiment of the invention a system for providing data, video, and voice to a group of end user devices is provided. The system includes a management entity, a video aware unit and a data aware unit. The video aware unit is connected to the data aware unit. The management unit is accessible to at least one out of the data aware unit and the video aware unit. The system is adapted to receive location information representative of distances between multiple end user devices and access nodes. The system is adapted to define compression levels of video programs to be provided to the end user devices in response to the location information and in response to access node bandwidth constraints. The system is adapted to provide, in response to the compression levels and to requests to receive services from the end user devices, data, compressed video and voice. It is noted that the compression of video streams is implemented by the video aware unit.

BRIEF DESCRIPTION OF THE DRAWINGS

The present invention will be understood and appreciated more fully from the following detailed description taken in conjunction with the drawings in which.

DETAILED DESCRIPTION

Figure 1:
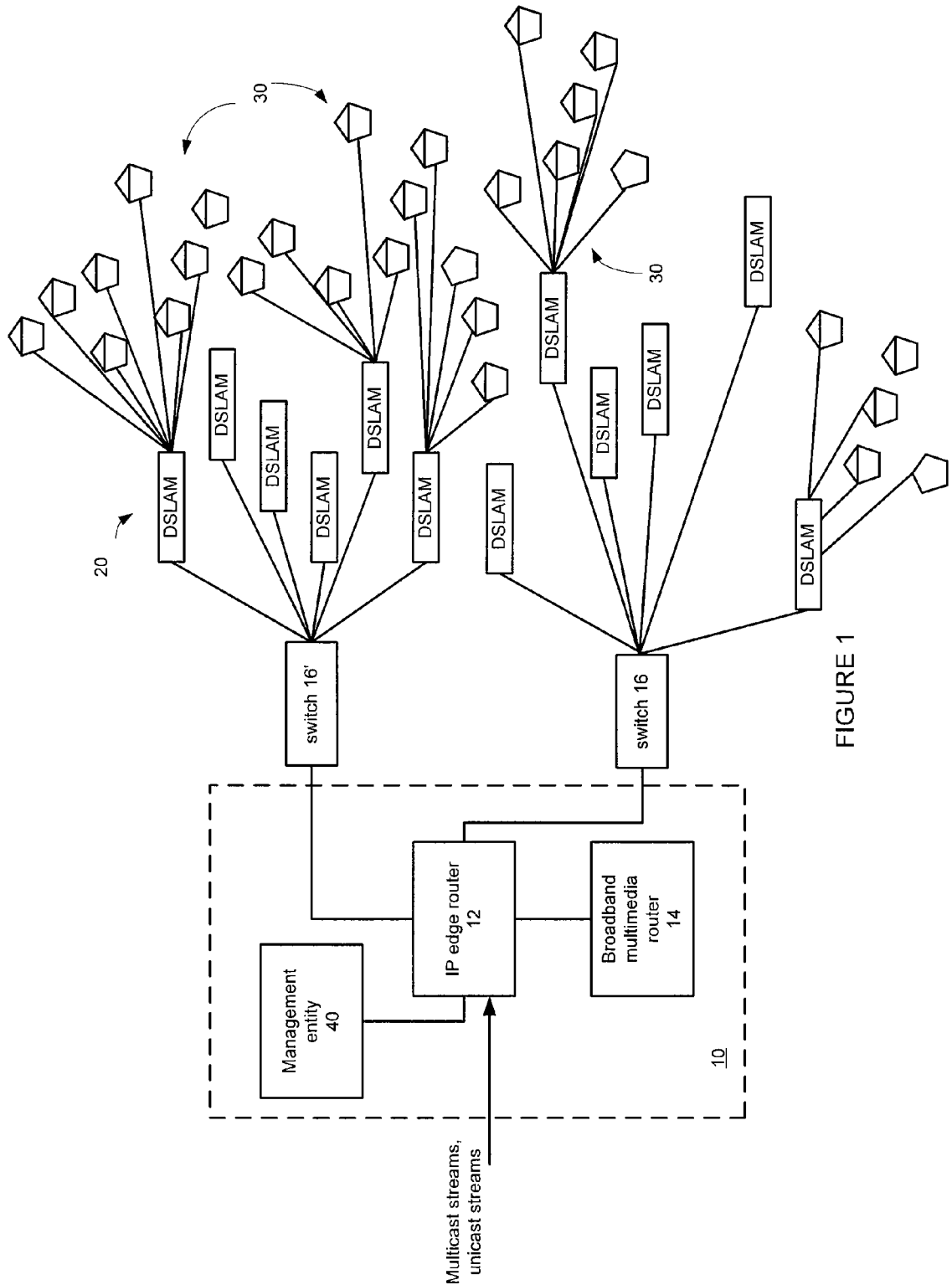
FIG. 1 illustrates a system and its environment, according to an embodiment of the invention.

A method and device are provided. The method and device are located in an access node such as a central office and can compress the video (perform data shaping), on an end-user device (usually on a residential access gateway) basis, such as to prevent the end-users from exceeding access bandwidth.

According to another embodiment of the invention streams can be provided to end user devices using multicast addresses or unicast addresses. Streams that are conveyed over a multicast stream can be duplicated by the DSLAM and sent to multiple end-user devices. Using unicast addresses is more bandwidth consuming but facilitates targeted advertisements. On the other hand the bandwidth of the limited bandwidth connection that leads to the DSLAM does not enable to send a unicast program to each residential access gateway, especially if multiple end-users request service concurrently.

Conveniently, some end-users will receive programs over unicast streams while other end-users will receive programs over multicast streams.

According to an embodiment of the invention the bandwidth of video steams can be compressed according to the number of users that view the program, the bandwidth limitation of the DSLAM and the bandwidth limitation imposed on the end user devices. It is noted that this compression can simplify the management of the streams provided to multiple end-users.

According to yet a further embodiment of the invention video, data and voice quality of service levels can be imposed. Conveniently, the video quality of service level can be maintained by video-aware units while voice and/or data quality of service levels are maintained by data-aware components.

According to an embodiment of the invention a video-aware unit can allocate a predefined bandwidth for voice applications (that are more delay sensitive), and allocate the remaining bandwidth to video and data. The bandwidth allocated to the video stream can be met by compressing the video stream, and the video aware unit can compress the video stream.

According to an embodiment of the invention the video-aware unit receives at least some of the quality of service-rules from the data-aware unit and can impose all the quality of service rules.

According to another embodiment of the invention the allocation of unicast and multicast addresses is responsive to the load on the DSLAM, the end-user profile and the like.

Conveniently, multicast addresses can be allocated to most end-users and unicast addresses are assigned to few end-users. The unicast addresses can be allocated statically or dynamically according to user statistics or to actual usage.

An exemplary video-aware unit can be a Broadband Multimedia Router of Bigband Networks Inc. of Fremont, Calif. A video-aware unit is described in U.S. Pat. No. 6,434,141 of Oz et al., titled "Communication management system and method", which is incorporated herein by reference.

A video-aware unit can receive media streams as well as media streams that are encapsulated in various types of packets or frames, and compress the media stream. One compression method is known as MPEG, although other compression methods can be applied by the video-aware unit.

According to an embodiment of the invention the compression of video streams increases the coverage area of the DSLAMs, as the distance between the DSLAM and the user is responsive to the overall bandwidth provided to the user.

According to an embodiment of the invention the video aware unit compresses programs in response to the distance of the user that requested the program and the DSLAM. Thus, more remote end user devices can receive more compressed video streams. If a group of users view a program that is conveyed over a multicast address then the compression level of that program can be responsive to the distance between the DSLAM and this group of users.

Conveniently, the allocation of multicast and unicast addresses can be responsive to the location of the requesting end users. For example, a program can be conveyed over two separate addresses (two multicast addresses, two unicast addresses, one multicast address and one unicast address) while one program is more compressed than the other. The more compressed program can be sent to the remote end users. According to an embodiment of the invention more than two different addresses can be allocated for conveying multiple versions of a program that differ from each other by their compression level.

FIG. 1 illustrates system 10 and its environment, according to an embodiment of the invention.

System 10 includes a management entity such as middleware 40, a video-aware unit such as broadband multimedia router 14 and a data aware unit such as switch 16. The environment includes IP edge router 12, switch 16', DSLAMs 20 and home residential access gateways 30. It is noted that for simplicity of explanation only few DSLAMS 20, few switches and few home residential access gateways are shown and also that for simplicity of explanation only some DSLAMs are illustrated as being connected to residential access gateways. It is noted that usually a very large number of residential access gateways exist.

IP edge router 12 receives multicast and unicast streams from various sources. These sources can include video sources, data sources and voice sources that are connected to an access network, a core network, an aggregation network or to a distribution network.

IP edge router 12 is connected to broadband multimedia router 14 and to switches 16 and 16'. It is noted that the number of switches can exceed two. Each switch out of switches 16 and 16' is connected to multiple DSLAMs 20 and 20'. Switch 16 can enforce data and voice quality of service rules, but is not able to compress video. Such a switch can be the Alcatel™ 7450 ESS Ethernet service switch that is capable of enforcing quality of service rules without compressing video.

The IP edge router 12 can be the Alcatel™ 750 ESS service router that is capable of supporting hierarchical service based quality of service, without compressing video.

Middleware 40 allocates multicast addresses and unicast addresses. It can be installed in various locations, such as the central office, video headend offices and the like. Multicast addresses can be assigned to programs and the set top boxes within houses 40 are informed about these multicast addresses (or only a multicast address of a requested program) such that they can request to receive a program by sending a "join" message. These set top boxes can switch to another program to otherwise stop receiving that program by sending a "leave" request.

IP edge router 12 can receive multicast and unicast streams and send them to broadband multimedia router 14. The IP edge router 12 can send the broadband multimedia router 14 quality of service rules, information indicative of the services requested by the end-users and bandwidth limitations of the DSLAM (or of the paths that lead to the DSLAM). The broadband multimedia router 14 can then selectively rate-shape (compress) the video streams in order to comply with video, data and voice quality of service rules. According to another embodiment of the invention the IP edge router 12 can indicate the available video bandwidth, the broadband multimedia router 14 can determine whether to compress the video streams or not, and provide a compressed video stream as well as an estimate of the bandwidth of the compressed video stream to the IP edge router 12 that in turn will decide how to allocate the remaining bandwidth between the video or data applications.

Conveniently, the broadband multimedia router 14 performs video compression on an end user device basis. Thus, every request to receive a service by a certain end user device is evaluated by the broadband multimedia router 14 in order to detect possible end user device bandwidth overflow and even DSLAM bandwidth overflow.

Thus, for example, assuming a request to receive a program that arrives from a certain end user device, this request is processed by the broadband multimedia router 14 and optionally by the middleware 40. The middleware can determine whether to assign to that program a unicast address, to assign a multicast address, whether there is a need to alter a previously assigned address to the program (for example altering the address from a unicast to a multicast address and vice verse), and the like.

The broadband multimedia router 14 will evaluate how to process the requested program. For example, it will compare the bandwidth constraints of the DSLAM connected to that end user device and the current bandwidth of video, data and voice provided to that DSLAM to determine the DSLAM available bandwidth. It will compare the bandwidth limitations (usually related to quality of service level) of the end user device to determine the available bandwidth to that end user device and in response to these two available bandwidth decide how to compress (if necessary) the requested program.

It is noted that if this program is already provided, over a multicast stream, to the DSLAM than the broadband multimedia router 14 can also examine the state (requested bandwidth, quality of service rules) associated with other end user devices, in order to determine whether to compress the program or not.

If, for example, a requested program is viewed by one or more end user devices, is conveyed using a multicast address, a new end user device requests to view the program and does not have a enough bandwidth to receive the program at its current version then the broadband multimedia router 14 can perform at least one of the following: (i) compress another program that is provided to the new end user device, (ii) temporarily reduce the bandwidth allocated for data and/or voice (without violating the quality of service levels associated with that new end user device), (iii) compress the requested program, or (iv) request from middleware 14 to allocate a unicast address over which the program will be provided to the new end user device and if the request is granted compress the program that is provided over the unicast address.

According to an embodiment of the invention the broadband multimedia router 14 can assign different compression priorities to unicast programs and to multicast programs. The broadband multimedia router 14 can then apply priority based compression schemes, such as but not limited to the method illustrated in U.S. Pat. No. 6,937,619 of Strasman et al., titled "Method and system for comparison-based prioritized bit rate conversion", which is incorporated herein by reference.

The compressed video streams are sent from the broadband multimedia router 14 to the IP edge router 16. The multicast and unicast streams that convey video, compressed video, voice and data are distributed to the end user devices over switches 16 and 16', DSLAMs 20 and the twisted pair (or other wires or wireless networks) connected to the end user devices.

Figure 2:
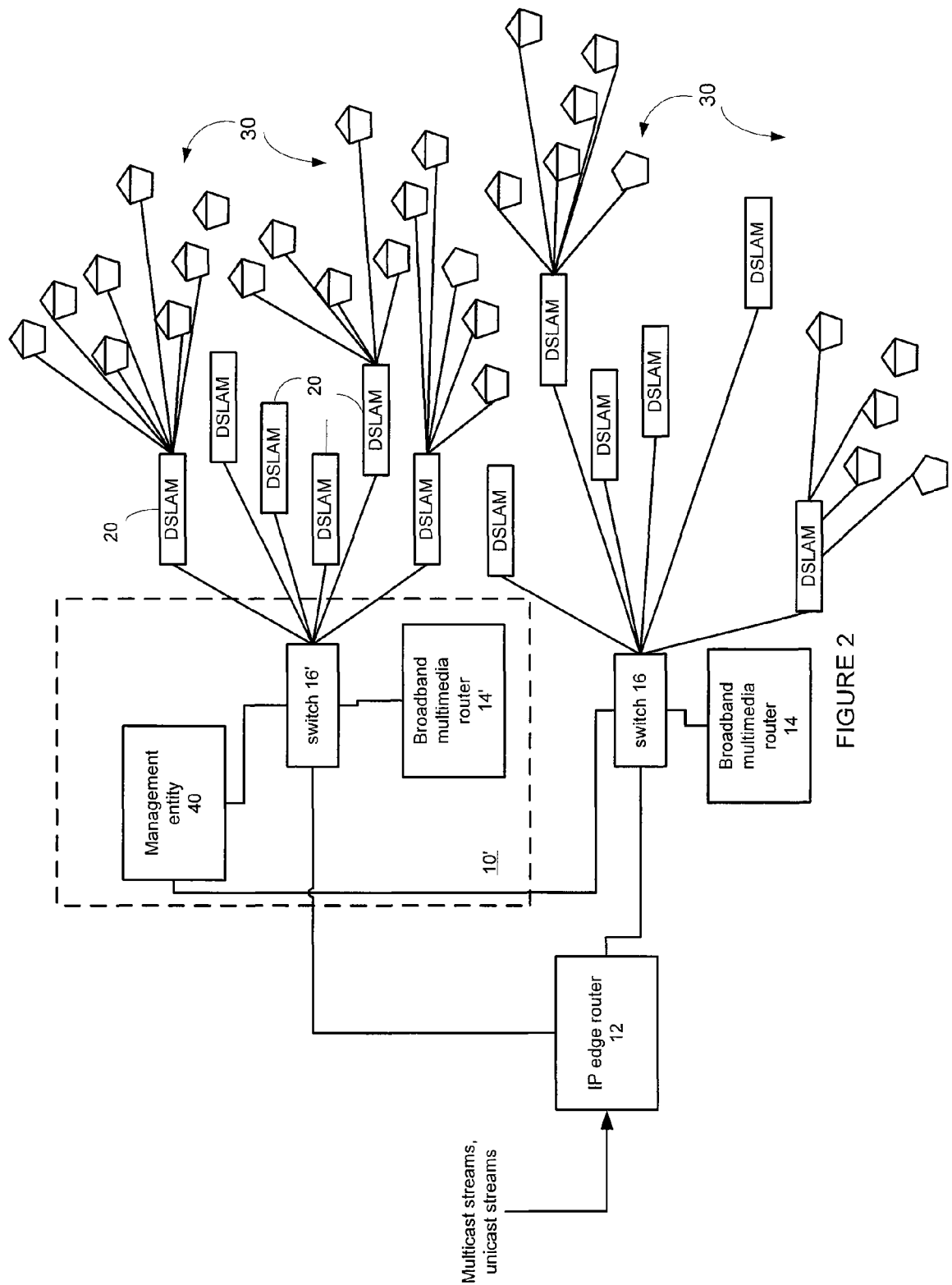
FIG. 2 illustrates a system and its environment, according to another embodiment of the invention.

FIG. 2 illustrates system 10' and its environment, according to another embodiment of the invention.

System 10' differs from system 10' by the number of broadband multimedia routers and their location. Instead of providing a broadband multimedia router per IP edge router 12, a broadband multimedia router is provided per switch. Thus, the number of broadband multimedia routers increases but the load per broadband access router is reduced.

In this scenario the data aware unit is the switch. The broadband access routers interact with switches 16 and 16' instead of interacting with the IP edge router 12.

Figure 3:
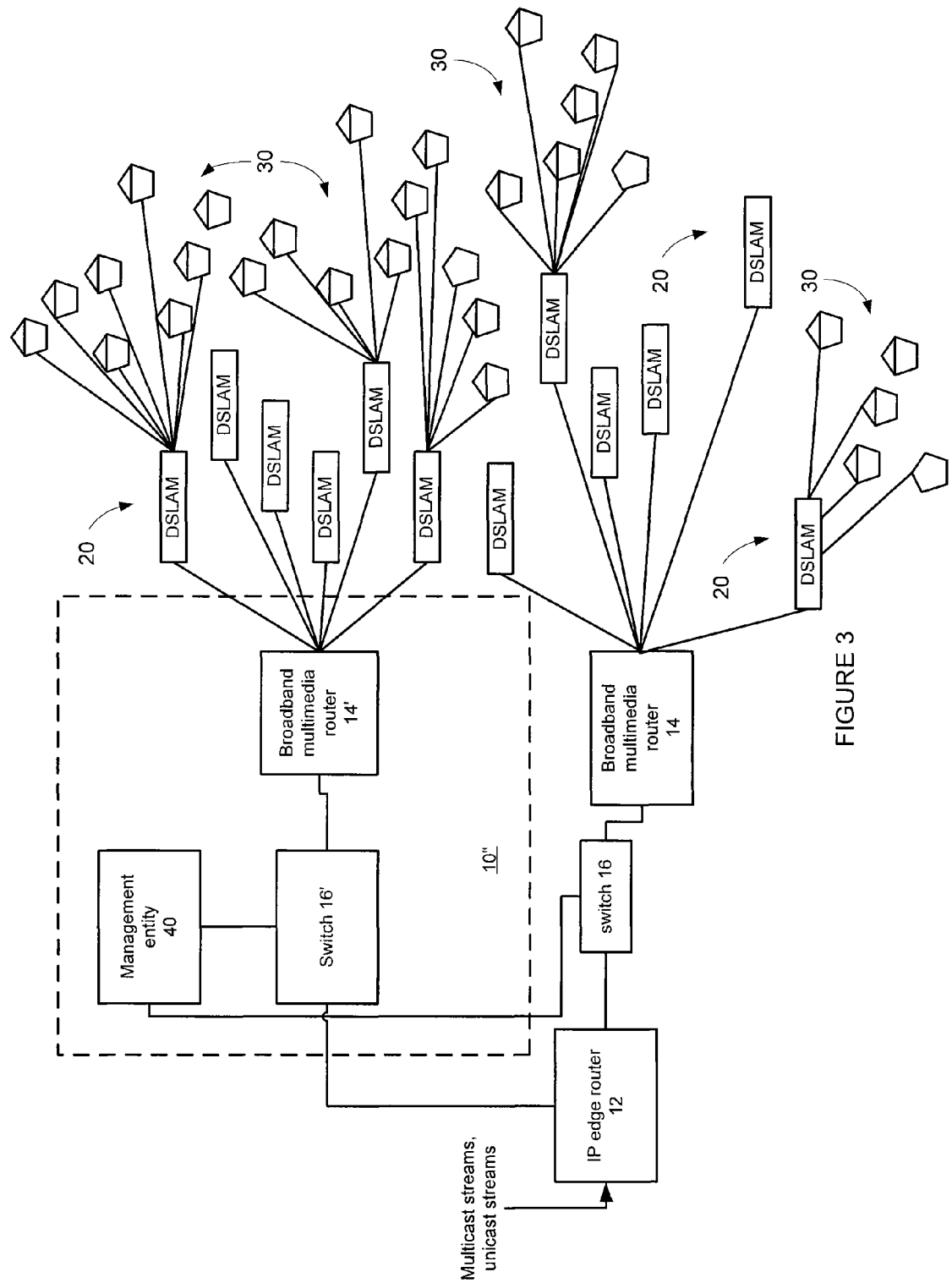
FIG. 3 illustrates a system and its environment, according to a further embodiment of the invention.

FIG. 3 illustrates system 10" and its environment, according to a further embodiment of the invention.

System 10" differs from system 10' by the location of the broadband multimedia routers. Each broadband multimedia router is positioned between a switch and a DSLAM. Thus, the broadband multimedia routers provide the various multicast and unicast streams to the DSLAMs.

It is noted that the data-aware unit and the video-aware unit can be integrated or that at least some functionality of the data-aware unit can be integrated within the video aware unit (and vise verse).

Figure 4:
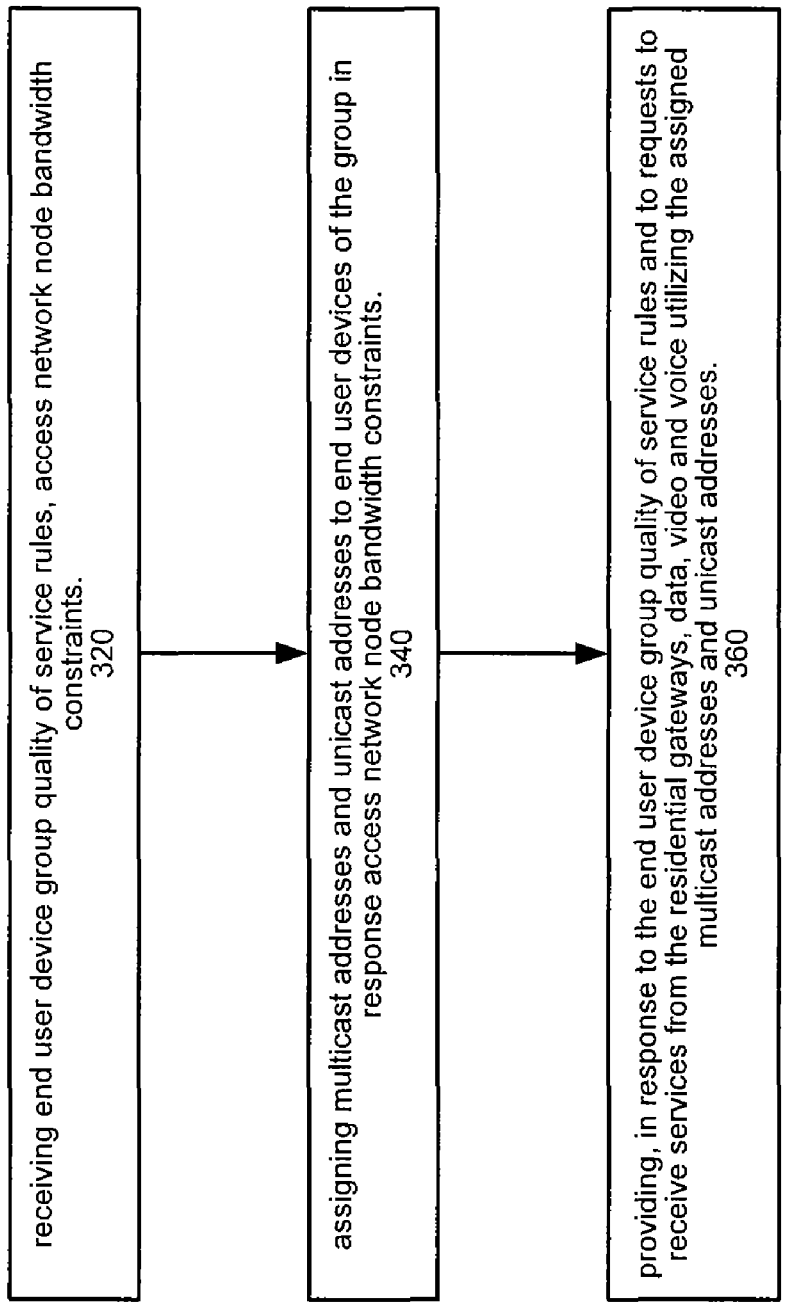
FIG. 4 illustrates a method according to an embodiment of the invention.

FIG. 4 illustrates a method 300 according to an embodiment of the invention.

Method 300 for providing data, video and voice to a group of end user devices starts by stage 320 of receiving end user device group quality of service rules, access network node bandwidth constraints.

Stage 320 is followed by stage 340 of assigning multicast addresses and unicast addresses to end user devices of the group in response to access network node bandwidth constraints.

Conveniently, if fewer services are required at a given point in time by the end-users connected to the access node more unicast streams can be allocated.

According to an embodiment of the invention the allocation of multicast and unicast addresses can be responsive to various parameters. These parameters can include the quality of service rules associated with different end-users, the amount of services supported by each end user device, end-user viewing patterns, end-user profile (for example socio economic profile), the number of end-users that view the program, and the like.

According to an embodiment of the invention the allocation is responsive to the location of end-users from the DSLAMs. As mentioned above different compressed versions of a program can be conveyed by using multiple different addresses. Conveniently more compressed programs are provided to remote end users.

Stage 340 is followed by stage 360 of providing, in response to the end user device group quality of service rules and to requests to receive services from the residential gateways, data, video, and voice utilizing the assigned multicast addresses and unicast addresses.

According to an embodiment of the invention stage 360 includes generating streams in response to quality of service rules and requests to receive services (data, video, voice) from the end user devices. The generated streams are then transmitted from the access node towards the end user devices.

Conveniently, stage 360 includes compressing at least one video stream provided to at least one end user device. Conveniently, stage 360 includes allocating a fixed bandwidth to time sensitive traffic (such as voice), and allocating remaining bandwidth to data and video. This can relax the response time of the video-aware unit, especially as voice traffic is very delay sensitive and the video compression is time consuming and also can achieve better results when making compression decisions over longer periods. These longer periods can enable the video-aware unit to better evaluate which video stream to compress and how to compress, especially given the bursty/statistical nature of video streams.

According to an embodiment of the invention stage 360 includes providing targeted advertisements to end user devices that are associated with unicast addresses. These targeted advertisements can be provided by a local content provider connected to the central office, but this is not necessarily so.

Conveniently, stage 360 includes compressing video streams in response to an amount of end-users that request to view the video streams. Thus if many end-users request to see the same program it can be compressed, thus simplifying the enforcements of the quality of service rules.

Conveniently, stage 360 includes compressing video streams in response to video quality of service levels associated with multiple end-users that receive the video stream. If there are many end-users an aggregate quality of service score can be defined. The score can reflect the average quality of service level, the standard deviation of the quality of service level, the maximal quality of service level, the minimal quality of service level or other statistical expressions that can represent the distribution of quality of service levels among the viewers of that program.

It is noted that a single end user device can receive multiple programs concurrently. Conveniently the compression levels of the programs can differ from each other, or can be the same.

Figure 5:
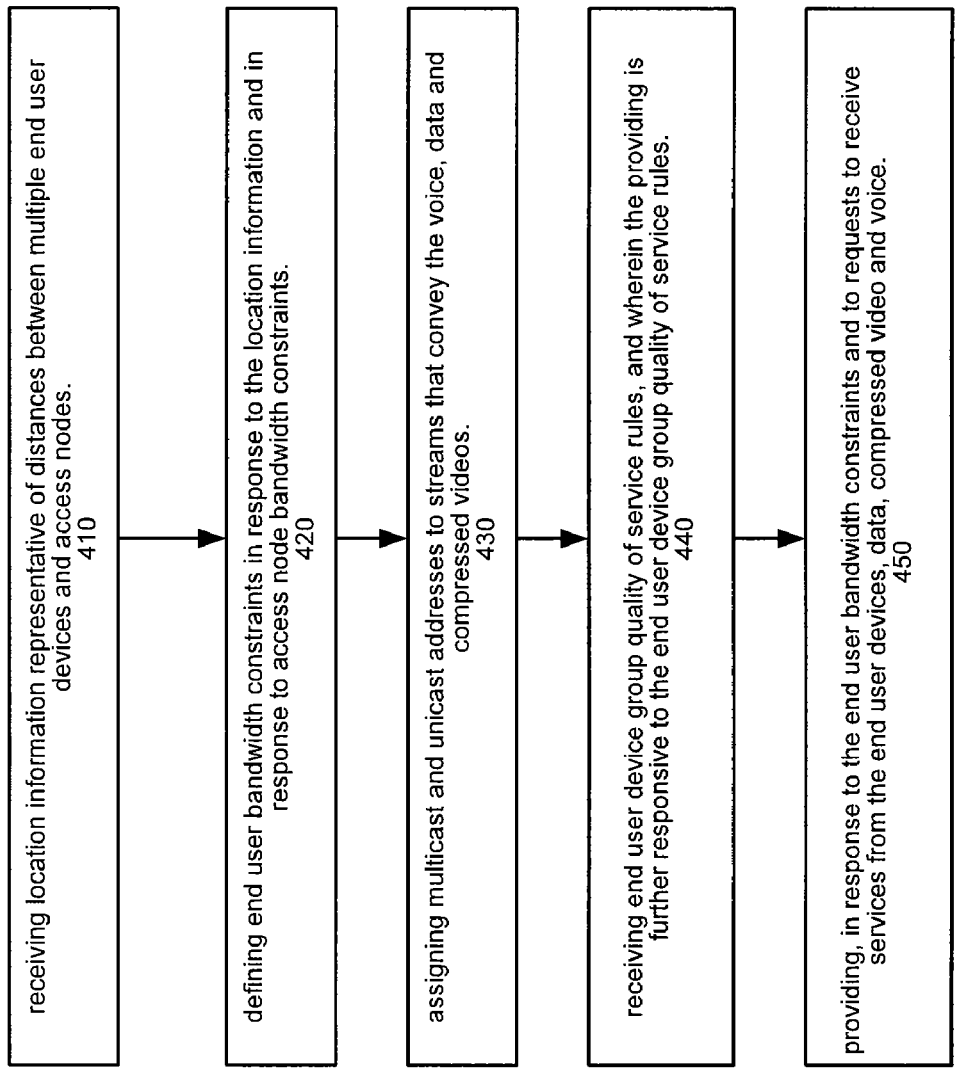
FIG. 5 illustrates a method according to another embodiment of the invention.

FIG. 5 illustrates a method 400 according to an embodiment of the invention.

Method 400 starts at stage 410 of receiving location information representative of distances between multiple end user devices and access nodes.

Stage 410 is followed by stage 420 of defining end user bandwidth constraints in response to the location information and in response to access node bandwidth constraints. These end user bandwidth constraints and additional factors (such as bandwidth of requested services) can determine the video compression levels. Conveniently, the end user bandwidth reduces as the distance between the access node to the end user device increases.

Stage 420 is followed by stage 430 of assigning multicast and unicast addresses to streams that convey the voice, data, and compressed videos. It is noted that stage 430 can be replaced by a stage of receiving multicast and unicast address allocation.

Stage 430 is followed by stage 440 of receiving end user device group quality of service rules, and wherein the providing is further responsive to the end user device group quality of service rules.

Stage 440 is followed by stage 450 of providing, in response to the end user bandwidth constraints and to requests to receive services from the end user devices, data, compressed video, and voice. Stage 450 conveniently includes compressing the video streams.

Variations, modifications, and other implementations of what is described herein will occur to those of ordinary skill in the art without departing from the spirit and the scope of the invention.

What is claimed is:

1. A method for providing data, video, and voice to a group of end user devices, the method comprising:
   receiving end user device group quality of service rules and access network node bandwidth constraints;
   receiving from residential gateways at least one request to receive a service;
   evaluating the at least one request to receive a service in response to access network node bandwidth constraints and a distance between the end user device group and an access network node;
   assigning, in response to a result of the evaluating, multicast addresses and unicast addresses to end user devices of the group; and
   compressing at least one video stream provided to at least one end user device in response to a number of the end-user devices that request viewing of the at least one video stream and in response to a location of a recipient of a program;
   wherein the compressing comprises compressing the program in different compression levels; and
   providing, in response to the end user device group quality of service rules and to the requests to receive services, data, video and voice utilizing the assigned multicast addresses and unicast addresses;
   wherein the providing comprises conveying the program over at least two separate unicast and multicast address, while one compressed program is more compressed than another, wherein the more compressed program is conveyed to at least one recipient of the program that is more remote than other recipients.

2. The method according to claim 1, further comprising allocating a fixed bandwidth to time sensitive traffic, and allocating remaining bandwidth to data and video.

3. The method according to claim 1, wherein providing data, video and voice comprises providing targeted advertisements to those of the end user devices that are associated with unicast addresses.

4. The method according to claim 1, further comprising compressing video streams in response to video quality of service levels associated with multiple ones of the end user devices that receive the video streams.

5. The method according to claim 1, further comprising assigning the multicast and unicast addresses in response to end user device statistics.

6. The method according to claim 1, further comprising compressing one video stream provided to a first one of the end user devices by a higher compression ratio than another video stream provided to that first one of the end user devices.

7. The method according to claim 1, wherein providing data, video and voice comprises enforcing quality of service rules by selectively compressing video streams.

8. The method according to claim 1, wherein at least one of the end user devices is a residential access gateway.

9. A method for providing data, video and voice to a group of end user devices, the method comprising:
receiving location information representative of distances between multiple end user devices and access nodes;
defining end user bandwidth constraints in response to the location information and in response to access node bandwidth constraints;
compressing at least one video stream provided to at least one end user device in response to a number of the end-user devices that request viewing of the at least one video stream and in response to a location of a recipient of a program;
wherein the compressing comprises compressing the program in different compression levels; and
providing, in response to the end user bandwidth constraints and to requests to receive services from the end user devices, data, compressed video, and voice;
wherein the providing comprises conveying the program over at least two separate unicast and multicast address, while one compressed program is more compressed than another, wherein the more compressed program is conveyed to at least one recipient of the program that is more remote than other recipients.

10. The method according to claim 9, further comprising assigning multicast and unicast addresses to streams that convey the voice, data and compressed videos to and assigning different compression priorities to unicast programs and multicast programs.

11. The method according to claim 9, further comprising receiving end user device group quality of service rules, and wherein providing the data, compressed video and voice is further responsive to the end user device group quality of service rules.

12. A system adapted to receive end user device group quality of service rules and access network node bandwidth constraints, the system comprising:
a video aware unit coupled to a data aware unit; and
a management entity accessible to at least one of the data aware unit and adapted to assign multicast addresses and unicast addresses to a group of end user devices in response to the access node bandwidth constraints and a distance between the group of end user devices and an access network node,
wherein the data aware unit and the video aware unit are adapted to provide, in response to the quality of service rules for the group of end user devices and to requests to receive services from residential gateways, data, video, and voice utilizing the assigned multicast addresses and unicast addresses
wherein the video aware unit is adapted to compress at least one video stream provided to at least one of the end user devices in response to a number of the end-user devices that request viewing of the at least one video stream and in response to a location of a recipient of a program;
wherein the system is further adapted to compress the program in different compression levels, to convey the program over at least two separate unicast and multicast address, while one compressed program is more compressed than another, wherein the more compressed program is conveyed to at least one recipient of the program that is more remote than other recipients.

13. The system according to claim 12, wherein the system is further adapted to allocate a fixed bandwidth to time sensitive traffic, and to allocate remaining bandwidth to data and video.

14. The system according to claim 12, wherein the system is further adapted to provide targeted advertisements to those of the end user devices that receive programs over unicast addresses.

15. The system according to claim 12, wherein the system is further adapted to allocate the unicast and multicast addresses based on a load on an access unit that is coupled to the at least one recipient of the program.

16. The method of claim 1, wherein the evaluating is carried out by a component of a multimedia distribution unit.

17. The method of claim 1, wherein the receiving comprises receiving from a first end-user device a request for a program that is conveyed using a multicast address to other end-user devices; wherein the assigning comprises assigning the multicast address to the first end-user device, and wherein the providing comprises compressing another program that is provided to the first end-user device, which is not the requested program, and providing the compressed another program to the first end-user device.

18. The method of claim 1, wherein the receiving comprises receiving from a first end-user device a request for a program that is conveyed using a multicast address to other end-user devices; wherein the assigning comprises assigning a unicast address to the first end-user device, and wherein the providing comprises compressing the requested program, providing the requested program to the multicast address, and providing the compressed requested program to the first end-user device using the unicast address.

19. The method of claim 1, wherein the method further comprises imposing video, data and voice quality of service levels.

20. The system according to claim 15, wherein the system is further adapted to assign different compression priorities to unicast programs and multicast programs.

21. The method of claim 1, wherein the assigning is carried out further in response to end-user viewing patterns.

22. The method of claim 1, wherein the assigning is carried out further in response to the amount of services that are supported by each end user device.

23. The method according to claim 1 further comprising assigning different compression priorities to unicast programs and multicast programs.

* * * * *